(12) United States Patent
Ochiai

(10) Patent No.: US 6,990,823 B2
(45) Date of Patent: Jan. 31, 2006

(54) AIR CONDITIONER

(75) Inventor: Yoshihiro Ochiai, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/989,079

(22) Filed: Nov. 15, 2004

(65) Prior Publication Data

US 2005/0066676 A1 Mar. 31, 2005

Related U.S. Application Data

(63) Continuation of application No. PCT/JP03/05951, filed on May 13, 2003.

(30) Foreign Application Priority Data

May 15, 2002 (JP) .............................. 2002-139734
Feb. 19, 2003 (JP) .............................. 2003-40764

(51) Int. Cl.
 *F25B 1/00* (2006.01)
 *F25B 49/00* (2006.01)
 *B60H 1/32* (2006.01)
(52) U.S. Cl. ...................... 62/228.3; 62/133; 62/228.4
(58) Field of Classification Search ................... 62/133, 62/228.1, 228.3, 228.4, 230, 244
See application file for complete search history.

(56) References Cited

U.S. PATENT DOCUMENTS

| 5,156,012 | A | 10/1992 | Kuribara et al. |
| 5,187,942 | A | 2/1993 | Komatsu et al. |
| 5,678,761 | A | 10/1997 | Ikeda |
| 5,765,383 | A | 6/1998 | Inoue |
| 5,823,000 | A | 10/1998 | Takai |
| 5,988,515 | A | 11/1999 | Funakoshi et al. |
| 5,992,156 | A | 11/1999 | Isobe et al. |
| 6,016,966 | A | 1/2000 | Inoue |
| 6,042,016 | A | 3/2000 | Ikeda |
| 6,341,494 | B1 | 1/2002 | Isobe et al. |
| D460,521 | S | 7/2002 | Fujita et al. |
| 6,418,738 | B1 | 7/2002 | Yamashita |
| 6,520,751 | B2 | 2/2003 | Fujita et al. |
| 6,523,361 | B2 | 2/2003 | Higashiyama |
| 6,681,583 | B2 | 1/2004 | Taguchi |
| 2001/0027659 | A1 * | 10/2001 | Ota et al. .................. 62/228.3 |
| 2004/0112074 | A1 * | 6/2004 | Komura et al. ............. 62/228.5 |

FOREIGN PATENT DOCUMENTS

EP 1101639 5/2001

(Continued)

*Primary Examiner*—Marc Norman
(74) *Attorney, Agent, or Firm*—Baker Botts L.L.P.

(57) ABSTRACT

An air conditioner accurately performs detection of a refrigerant circulation amount and improves a basic function including an accuracy and a response characteristic of a control for achieving stable maintenance of a room temperature. An electronic control system includes a controller performing an air-conditioning control so that flow detected information from a hot-wire flow sensor, refrigerant operation state information from a refrigerant operation state sensor, and temperature information from a resistance value sensor are added in external information detection means. Detection of the refrigerant circulation amount can be carried out more accurately and properly, a pressure control of a crank chamber pressure Pc is properly carried out through a gas feed passage by a control valve of a variable displacement compressor, the control valve being controllably driven by the controller through a drive circuit, and the basic function including an engine load control and an air-conditioning control is remarkably improved.

22 Claims, 5 Drawing Sheets

FOREIGN PATENT DOCUMENTS

| | | |
|---|---|---|
| JP | 58179215 | 11/1983 |
| JP | 6330931 | 8/1988 |
| JP | H11159449 | 6/1999 |
| JP | 2001140767 | 5/2001 |
| JP | 2001260645 | 9/2001 |
| JP | 2002005717 | 1/2002 |

* cited by examiner

AIR CONDITIONER

CROSS-REFERENCE TO RELATED APPLICATION

This application is a continuation of copending International Application No. PCT/JP03/05951 filed May 13, 2003 which designates the United States, and claims priority to Japanese application no. 139734/2002 filed May 15, 2002 and Japanese application no. 40764/2003 filed Feb. 19, 2003.

TECHNICAL FIELD OF THE INVENTION

The invention relates generally to an air conditioner which comprises a refrigerant circulation circuit including a variable displacement compressor and is mainly mounted in a vehicle such as an automobile, and more specifically, to an air conditioner capable of carrying out a discharge capacity control for optimizing an engine load caused by a compressor so as to achieve stable maintenance of a room temperature.

BACKGROUND ART

With respect to one example of well-known air conditioners, there has conventionally been a type in which a refrigerant circulation circuit is formed by a circulation circuit running through a condenser, a pressure reducing device (expansion valve), an evaporator, and a variable displacement compressor (particularly a suction chamber, a cylinder bore, and a discharge chamber on the inside thereof). In those air conditioners, there is known a type in which a control valve in the variable displacement compressor has a function of detecting, as an index for estimating the refrigerant discharge capacity, a differential pressure between two pressure monitor points set in the refrigerant circulation circuit, and performing a feedback control of the discharge capacity of the variable displacement compressor so that the differential pressure between the two points approaches a set differential pressure, and further, a controller disposed outside the refrigerant circulation circuit determines or recalculates the set differential pressure based on switching information from a mode selector switch and an airflow switch of an air-conditioning operation panel (which is used as information for notifying a sudden change in cooling load to the controller in advance or simultaneously with the change) and commands the control valve to change the set differential pressure, and hence, having such a functional structure makes it possible, in addition to enabling both a discharge capacity control of the compressor for stable maintenance of a room temperature and an emergent temporary quick change in discharge capacity, to improve an accuracy and a response characteristic of the control for the stable maintenance of the room temperature.

Such an air conditioner is disclosed in, for example, Japanese Patent Application Publication (JP-A) No. 2001-140767.

On the other hand, in case of this air conditioner, the differential pressure caused by the refrigerant flow between the two pressure monitor points is detected by a differential pressure sensor for detecting the refrigerant circulation amount in the refrigerant circulation circuit, and the feedback control of the discharge capacity in the variable displacement compressor is carried out by observing correlation between the differential pressure between the two pressure monitor points obtained herein and the refrigerant circulation amount. However, it is essential to accurately detect the differential pressure in order to stably carry out the feedback control of the discharge capacity herein.

In view of this, it is effective to apply a technique of lengthening a distance between the two pressure monitor points or providing a restriction member in the refrigerant circulation circuit in order to improve the accuracy of the detection of the differential pressure between the two pressure monitor points. However, there is a problem that when such a structure is adopted, the basic structure of the air conditioner becomes complicated or the design of the variable displacement compressor becomes complicated, and therefore, it is actually difficult to apply it and, as a result, the basic performance is not fully exhibited.

Specifically, when there is applied the structure in which the distance between the two pressure monitor points is lengthened, one (a conduit from a pressure monitor point P1 in case of FIG. 1) of two conduits joined to a main pipe, where a refrigerant flows, for leading the refrigerant from its pressure monitor points P1 and P2 to a differential pressure sensor 100 should be made long as shown in FIG. 1. As a result, the basic structure of the air conditioner becomes complicated.

On the other hand, when there is applied the structure in which the restriction member is provided in the refrigerant circulation circuit, a restriction member 101 is provided between pressure monitor points P1 and P2 in a main pipe where a refrigerant flows and it is possible to make short two conduits joined to the main pipe for leading the refrigerant from its pressure monitor points P1 and P2 to a differential pressure sensor 100 as shown in FIG. 2. However, in case of this structure, the efficiency of the air conditioner is lowered due to occurrence of a pressure loss caused by the restriction member 101 and, as a result, the design of the variable displacement compressor becomes complicated. In particular, when the differential pressure between the two pressure monitor points P1 and P2 is directly used as a force against an electromagnetic force of the control valve of the variable displacement compressor, a passage is required for leading the pressure at one of the two pressure monitor points P1 and P2 to the variable displacement compressor, while, when the restriction member 101 is disposed inside the variable displacement compressor and the differential pressure is used as a force against an electromagnetic force of the control valve, the problem of pressure loss cannot be avoided and further a differential pressure passage should be provided inside the variable displacement compressor. Consequently, in any event, the design for improvement of the variable displacement compressor becomes complicated.

It is therefore a technical object of the present invention to provide an air conditioner that can easily perform detection of a refrigerant circulation amount accurately and properly with a simple structure and that can further improve a basic function including an accuracy and a response characteristic of a control for achieving stable maintenance of a room temperature.

SUMMARY OF THE INVENTION

According to the present invention, there is obtained an air conditioner comprising a refrigerant circulation circuit including a variable displacement compressor, the air conditioner comprising hot-wire flow detection means for detecting a refrigerant circulation amount in the variable displacement compressor to produce a flow detected signal obtained by converting it into an electrical signal, refrigerant state detection means for detecting from the external a refrigerant circulating operation state including a cooling load state at least in the refrigerant circulation circuit to produce a refrigerant operation state signal, and discharge capacity control means for determining a refrigerant circulation amount target value in the variable displacement compressor based on the flow detected signal and the refrigerant operation state signal and for performing a feedback control of a discharge capacity in the variable displacement compressor as a normal mode based on a result of comparison between the flow detected signal and the refrigerant circulation amount target value so that the flow detected signal approaches the refrigerant circulation amount target value.

Further, according to the present invention, with respect to the foregoing air conditioner, there is obtained the air conditioner wherein the refrigerant state detection means includes a suction pressure sensor for detecting a low-pressure side pressure as the refrigerant circulating operation state at least in the refrigerant circulation circuit to produce a low-pressure detected signal, and the discharge capacity control means determines a low-pressure side pressure target value based on the low-pressure detected signal and performs a feedback control, switchably between itself and the feedback control of the normal mode, of the discharge capacity in the variable displacement compressor based on a result of comparison between the low-pressure detected signal and the low-pressure side pressure target value so that the low-pressure detected signal approaches the low-pressure side pressure target value.

Further, according to the present invention, with respect to the foregoing air conditioner, there is obtained the air conditioner wherein the hot-wire flow detection means is disposed between a discharge chamber of the refrigerant circulation circuit including the variable displacement compressor and an inlet of a condenser.

In addition, according to the present invention, with respect to the foregoing air conditioner, there is obtained the air conditioner wherein the hot-wire flow detection means comprises a Wheatstone bridge circuit formed by connecting together a hot-wire resistor and a resistor of a thermometer which are exposed to a refrigerant flow and a pair of resistors which are not exposed to the refrigerant flow, a control circuit that applies a predetermined voltage to an input side, where the hot-wire resistor and the resistor of the thermometer in the Wheatstone bridge circuit are located, to control a current flowing in the hot-wire resistor so that a refrigerant temperature difference obtained from resistance value changes in the hot-wire resistor and the resistor of the thermometer becomes constant, and a potential difference detection circuit that detects an output potential difference between an output side grounded, where the pair of resistors in the Wheatstone bridge circuit are located, and a point between the hot-wire resistor and one of the pair of resistors to thereby obtain the flow detected signal.

On the other hand, according to the present invention, with respect to the foregoing air conditioner, there is obtained the air conditioner comprising temperature information output means for outputting temperature information indicative of a temperature of the thermometer and temperature comparison means for comparing a predetermined set temperature and the temperature information at the thermometer, wherein the discharge capacity control means controls the discharge capacity of the variable displacement compressor so as to reduce the refrigerant circulation amount when the temperature of the thermometer exceeds the set temperature according to a result of comparison by the temperature comparison means, or the air conditioner comprising temperature information output means for outputting temperature information indicative of a temperature of the thermometer and temperature comparison means for comparing a predetermined set temperature and the temperature information at the thermometer, wherein the discharge capacity control means controls the discharge capacity of the variable displacement compressor so as to minimize the refrigerant circulation amount when the temperature of the thermometer exceeds the set temperature according to a result of comparison by the temperature comparison means, or the air conditioner comprising temperature information output means for outputting temperature information indicative of a temperature of the thermometer, wherein the discharge capacity control means controls a blow amount of a blower fan of a condenser provided in the refrigerant circulation circuit on the basis of the temperature information at the thermometer.

Further, according to the present invention, with respect to the foregoing air conditioner, there is obtained the air conditioner wherein the hot-wire resistor is formed by helically processing and disposing a platinum thin film on an outer periphery of a hollow cylindrical member or solid cylindrical member which have high insulation or by helically coiling a platinum line on the outer periphery of the hollow cylindrical member or the solid cylindrical member.

Further, according to the present invention, with respect to the foregoing air conditioner, there is obtained the air conditioner wherein the hot-wire resistor and the thermometer are formed and disposed as a predetermined pattern of a platinum thin film resistor on a highly insulating substrate member.

In addition, according to the present invention, with respect to the foregoing air conditioner, there is obtained the air conditioner wherein the pair of resistors in the Wheatstone bridge circuit excluding the hot-wire resistor and the resistor of the thermometer, the control circuit, and the potential difference detection circuit of the hot-wire flow detection means are incorporated in a control valve of the variable displacement compressor.

On the other hand, according to the present invention, with respect to the foregoing air conditioner, there is obtained the air conditioner comprising engine speed detection means mounted in a vehicle having an engine mounted therein for detecting a speed of the engine to produce an engine speed signal and further comprising refrigerant shortage detection means for detecting a shortage of refrigerant in the refrigerant circulation circuit based on the engine speed signal, the flow detected signal, and the refrigerant circulation amount target value.

Further, according to the present invention, with respect to the foregoing air conditioner, there is obtained the air conditioner wherein the refrigerant shortage detection means detects the shortage of refrigerant based on at least a difference value between the flow detected signal and the refrigerant circulation amount target value.

DETAILED DESCRIPTION OF THE PREFERRED EMBODIMENTS

The present invention will be described in more detail with reference to the accompanying drawings.

Figure 1:
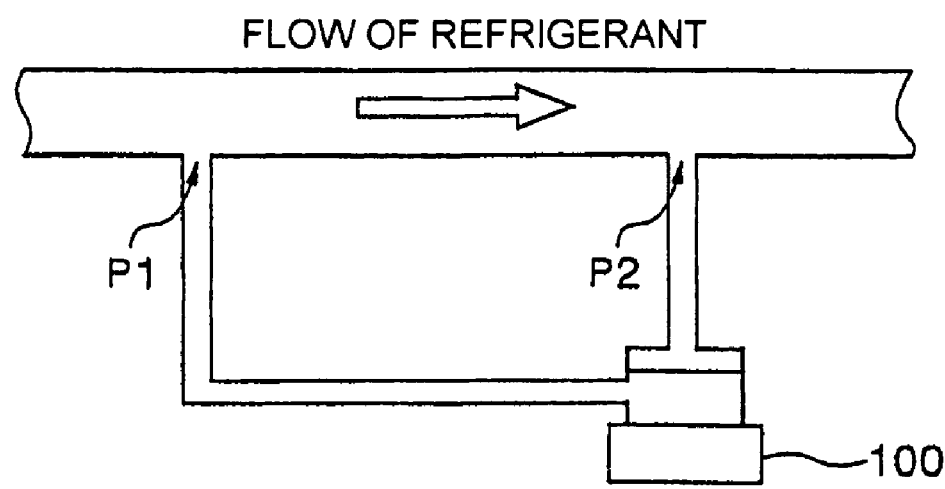
FIG. 1 is a schematic diagram showing a structure of the main part when there is applied one technique for improving an accuracy of detection of a differential pressure caused by the flow of refrigerant between two pressure monitor points in a refrigerant circulation circuit of a conventional air conditioner.
Figure 2:
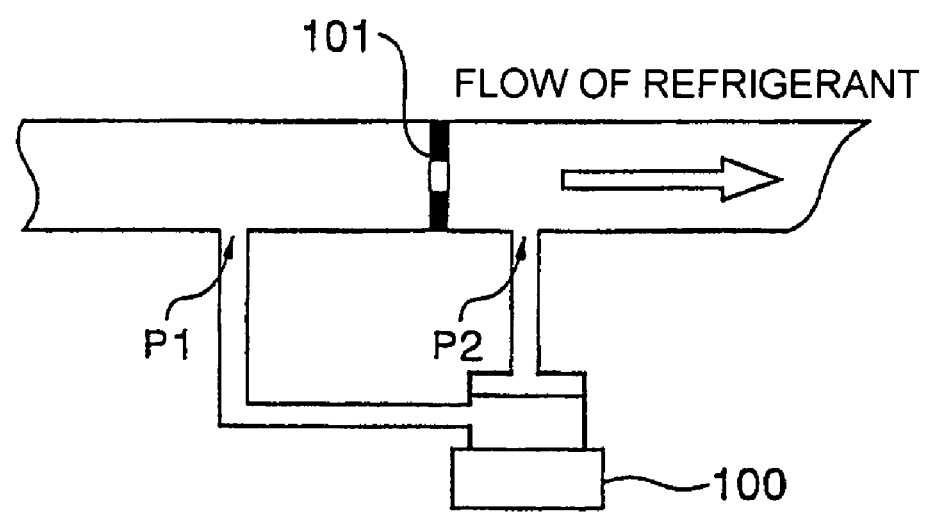
FIG. 2 is a schematic diagram showing a structure of the main part when there is applied another technique for improving an accuracy of detection of a differential pressure caused by the flow of refrigerant between two pressure monitor points in a refrigerant circulation circuit of a conventional air conditioner.
Figure 3:
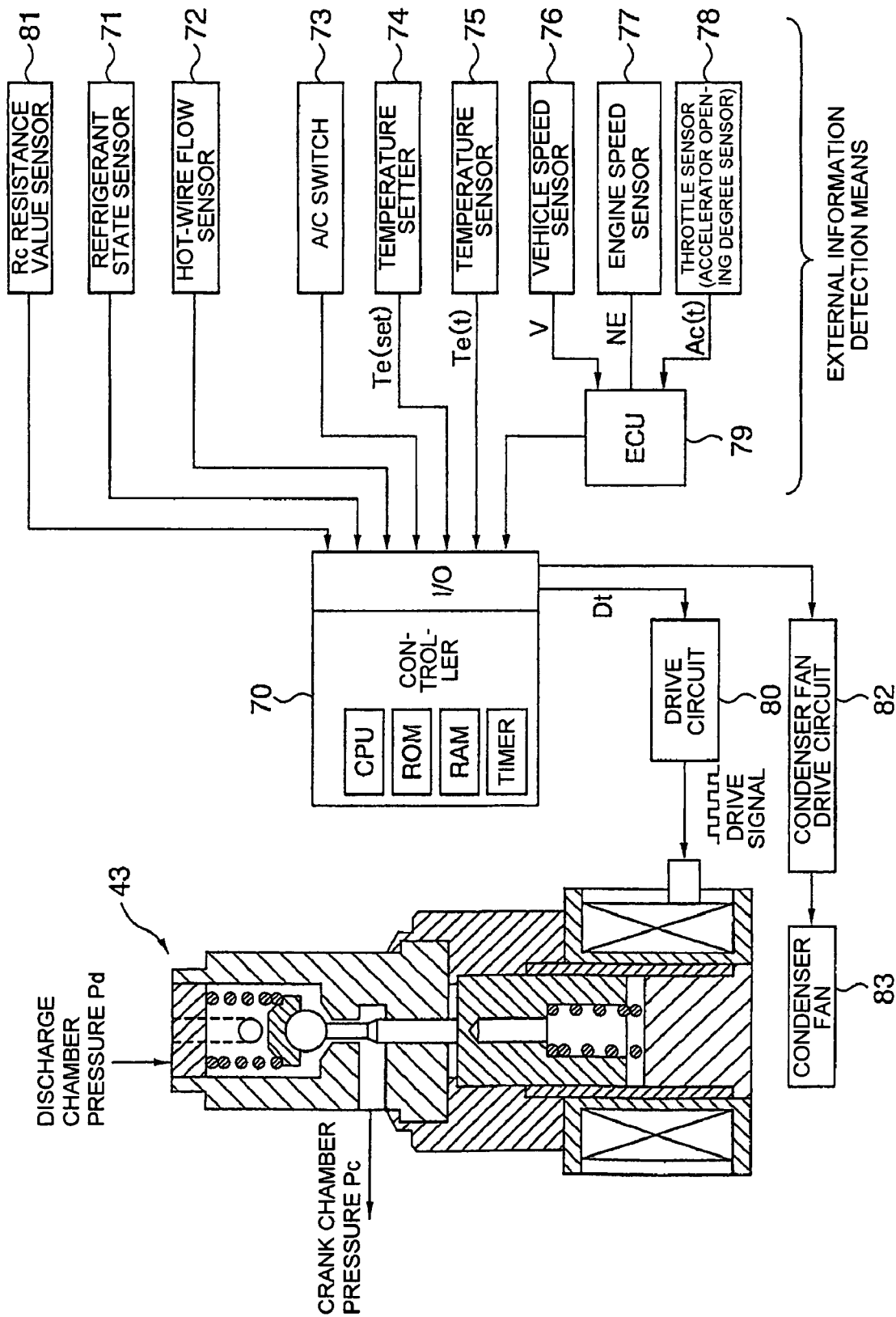
FIG. 3 is a block diagram showing a structure of the main part of an electronic control system of an air conditioner according to one embodiment of the present invention.

FIG. 3 is a block diagram showing a structure of the main part of an electronic control system of an air conditioner according to one embodiment of the present invention. Like the conventional air conditioner, this air conditioner also comprises a refrigerant circulation circuit including a variable displacement compressor mounted in a vehicle such as an automobile and further composed of a condenser, a pressure reducing device (expansion valve), and an evaporator which are not illustrated. The main part of the electronic control system herein comprises external information detection means for sending results of detection of various external information to a controller 70, the controller 70 for carrying out an overall air-conditioning control by calculating and outputting, based on the various external information from the external information detection means, a proper duty ratio Dt of a drive signal that is produced from a drive circuit 80 to a coil of a later-described control valve 43 of the variable displacement compressor, and the drive circuit 80 for producing the duty-controlled drive signal to the coil of the control valve 43 based on a command from the controller 70.

Among them, the external information detection means comprises a hot-wire flow sensor 72 as hot-wire flow detection means for detecting a refrigerant circulation amount in the variable displacement compressor to produce a flow detected signal obtained by converting the refrigerant circulation amount into an electrical signal, a refrigerant state sensor 71 as refrigerant state detection means for detecting from the external a refrigerant circulating operation state including a cooling load state at least in the refrigerant circulation circuit to produce a refrigerant operation state signal, an A/C switch 73 operated by a member in the vehicle for producing ON/OFF setting information of the air conditioner, a temperature setter 74 operated by the member in the vehicle for produce a set temperature Te (set) indicative of setting information about a desired temperature of the air conditioner, a temperature sensor 75 provided in the vicinity of the evaporator on its air outlet side in the refrigerant circulation circuit for detecting a temperature Te (t) of blow-out air cooled by passing through the evaporator to produce it as room temperature information, and an engine control unit (ECU) 79 being an electronic control unit connected to a vehicle speed sensor 76 which detects a vehicle speed V to produce it, to an engine speed sensor 77 which detects an engine speed NE to produce it, and to a throttle sensor (accelerator opening degree sensor) 78 which detects an opening degree (or an angle) of a throttle valve provided in an intake pipe of an engine to produce it as accelerator opening degree Ac (t) information, thereby sending information about these operating conditions of the vehicle.

On the other hand, the controller 70 is a control unit, similar to a computer, comprising at least a CPU, a ROM, a RAM, a timer, and an I/O. The drive circuit 80 is connected to an output terminal of the I/O, while, to input terminals of the I/O are connected the foregoing respective parts of the external information detection means, i.e. the refrigerant state sensor 71, the hot-wire flow sensor 72, the A/C switch 73, the temperature setter 74, the temperature sensor 75, and the engine control unit (ECU) 79. The controller 70 judges the current state based on various external information provided from the external information detection means to thereby calculate a proper duty ratio Dt of a drive signal that is produced to the coil of the control valve 43 from the drive circuit 80, and commands the drive circuit 80 to produce the drive signal with the calculated duty ratio Dt. This makes it possible to quickly change a crank pressure Pc in the variable displacement compressor and, in its turn, to quickly change the stroke of pistons (this also represents a discharge capacity and reflects the magnitude of a load torque).

Therefore, the controller 70 functions as set differential pressure determination means, and the controller 70, the drive circuit 80, and the control valve 43 are cooperatively formed as discharge capacity control means for determining a refrigerant circulation amount target value in the variable displacement compressor based on various external information characteristically including the flow detected signal from the hot-wire flow sensor 72 and the refrigerant operation state signal from the refrigerant state sensor 71, and for performing a feedback control of the discharge capacity in the variable displacement compressor as a normal mode based on a result of comparison between the flow detected signal and the refrigerant circulation amount target value so that the flow detected signal approaches the refrigerant circulation amount target value.

Figure 4:
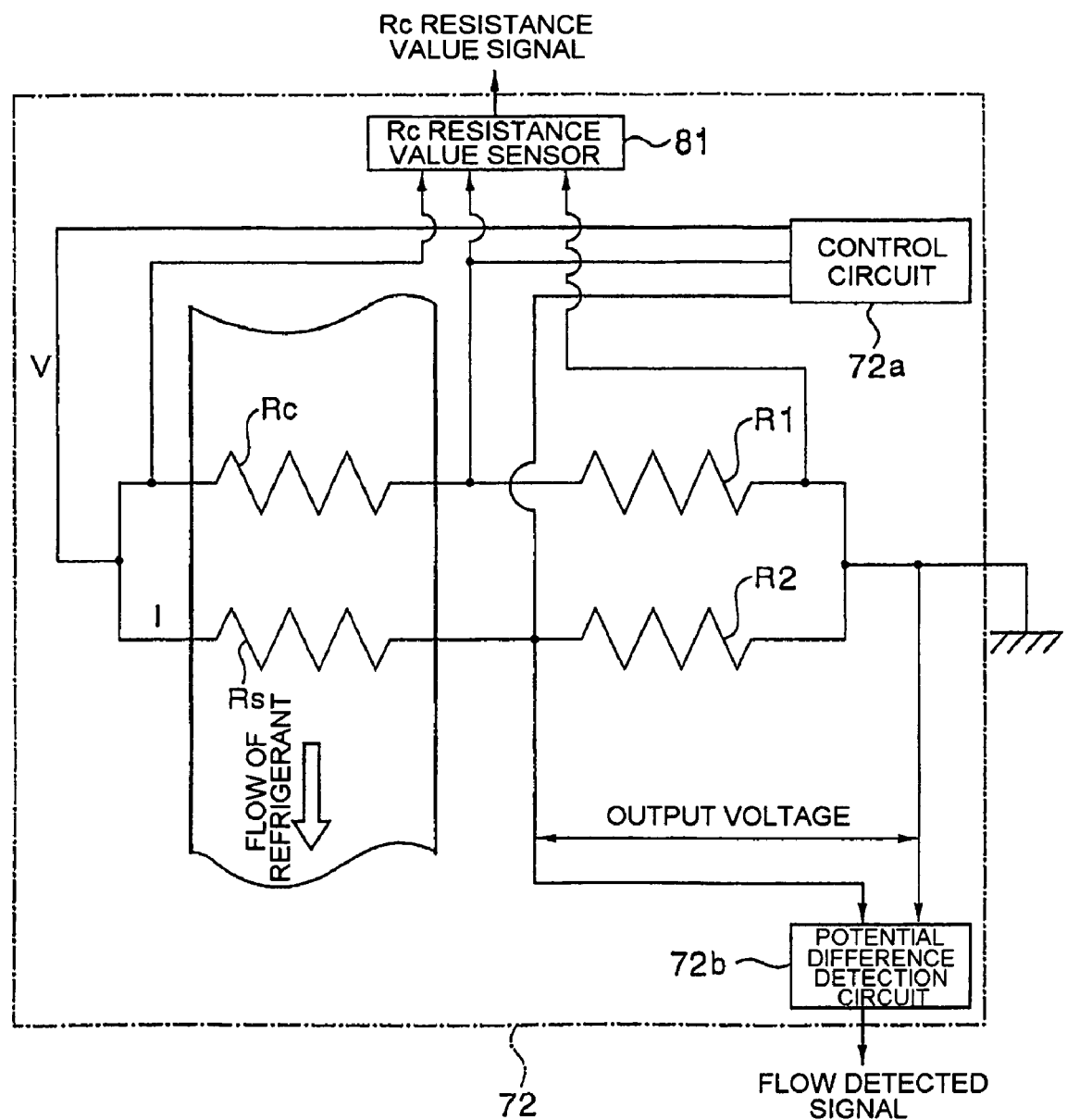
FIG. 4 is a circuit diagram showing a detailed structure of a hot-wire flow sensor provided in the main part of the electronic control system of the air conditioner explained in FIG. 3.

The discharge capacity control means herein is, as compared with that of the structure disclosed in FIG. 4 of Japanese Patent Application Publication (JP-A) No. 2001-140767, newly added, as various external information in the external information detection means, with the flow detected information from the hot-wire flow sensor 72 being the hot-wire flow detection means, the refrigerant operation state information from the refrigerant operation state sensor 71 being the refrigerant operation state detection means, and temperature information indicative of a temperature of a thermometer (given as an Rc resistance value representing a resistor Rc of the thermometer) from a later-described Rc resistance value sensor 81 being temperature information output means disposed in the hot-wire flow sensor 72. Therefore, the detection of the refrigerant circulation amount can be carried out more accurately and properly so that the basic function including the accuracy and response characteristic of the control for achieving the stable maintenance of the room temperature is remarkably improved and therefore the control of the discharge capacity for increasing the life duration of the variable displacement compressor is also enabled.

On the other hand, the foregoing refrigerant state sensor 71 may be configured to include a suction pressure sensor for detecting a low-pressure side pressure as a refrigerant circulating operation state in the refrigerant circulation circuit to produce a low-pressure detected signal, and the discharge capacity control means may function to determine a low-pressure side pressure target value based on the low-pressure detected signal and to perform a feedback control, switchably between itself and the foregoing feedback control of the normal mode, of the discharge capacity in the variable displacement compressor at a predetermined pressure or flow rate set by the controller 70 so that the low-pressure detected signal approaches the low-pressure side pressure target value, on the basis of a result of comparison between the low-pressure detected signal and the low-pressure side pressure target value. In this case, the engine load control and the air-conditioning control are further improved.

Specifically, if the function of switching between the feedback control of the normal mode mainly based on the flow detected information from the hot-wire flow sensor 72 and the feedback control based on the refrigerant low-pressure detected information from the refrigerant state sensor 71 is constructed in the discharge capacity control means, an optimum control in which advantages of the respective controls are derived is made possible so that it is possible to harmonize between comfortableness of the air conditioning and load reduction of the engine on a high level. Particularly, it is preferable to perform, in a low-load region, the feedback control on the low-pressure side for achieving prevention of frost formation of the evaporator and to perform, in a high-load region where the engine load is large, the feedback control of the normal mode that can securely reduce the engine load during rapid acceleration or the like.

Further, if in the discharge capacity control means, temperature information (obtained as an Rc resistance value) mainly of the thermometer from the Rc resistance value sensor 81 and a set temperature predetermined in a storage device or the like are compared therebetween by temperature comparison means provided in the controller 70, and the discharge capacity in the variable displacement compressor is controlled based on a result of the comparison so that the refrigerant circulation amount is reduced or minimized when the temperature of the thermometer exceeds the set temperature, the increased life duration of the variable displacement compressor can be achieved without impeding the function of the air conditioner. Further, if the blow amount of a blower fan (condenser fan 83) of the condenser provided in the refrigerant circulation circuit is controlled by the discharge capacity control means through a condenser fan drive circuit 82 on the basis of the temperature information of the thermometer herein, it is possible to control the condenser without using a pressure switch or a pressure sensor like in the conventional technique.

FIG. 4 is a circuit diagram showing a detailed structure of the hot-wire flow sensor 72 provided in the main part of the electronic control system of the air conditioner. This hot-wire flow sensor 72 is disposed in the refrigerant circulation circuit including the variable displacement compressor, preferably between a discharge chamber 41 and an inlet of the non-illustrated condenser, and comprises a Wheatstone bridge circuit formed by connecting together a hot-wire resistor Rs and a resistor Rc of the thermometer which are exposed to the refrigerant flow and a pair of resistors R1 and R2 which are not exposed to the refrigerant flow, a control circuit 72a that applies a predetermined voltage V to an input side, where the hot-wire resistor Rs and the resistor Rc of the thermometer in the Wheatstone bridge circuit are located, to control a current I flowing in the hot-wire resistor Rs so that a refrigerant temperature difference obtained from resistance value changes in the hot-wire resistor Rs and the resistor Rc of the thermometer becomes constant, and a potential difference detection circuit 72b that detects an output potential difference between an output side grounded, where the pair of resistors R1 and R2 in the Wheatstone bridge circuit are located, and a point between the hot-wire resistor Rs and one (R2) of the pair of resistors R1 and R2 to thereby obtain the flow detected signal. Further, both ends of each of the resistor Rc of the thermometer and the resistor R1 are connected to the Rc resistance value sensor 81. The Rc resistance value sensor 81 derives an Rc resistance value representing temperature information based on a voltage $V_{RC}$ across the resistor Rc of the thermometer and a voltage $V_{R1}$ across the resistor R1 by the use of an expression of relation given by $Rc = V_{RC} \cdot R1 / V_{R1}$ to produce it as an Rc resistance value signal. It is assumed herein that R1 is a known constant and Rc is derived in advance in correlation with a temperature.

Hereinbelow, description will be given about a principle of the refrigerant flow detection in the hot-wire flow sensor 72. With respect to a heat transfer coefficient h from the hot-wire resistor Rs placed in the refrigerant flow to the refrigerant, a relationship of $h = \alpha + \beta (G)^{1/2}$ is established given that $\alpha$ and $\beta$ are constants and G is a weight (mass) of the refrigerant. Further, taking account of balance of the power (calorific value) applied to the hot-wire resistor Rs in this relationship, a relationship of $VI = \{\alpha + \beta (G)^{1/2}\} A (Th - Ta)$ is established given that an application voltage is V, a supply current is I, a sectional area is A, and a temperature is Th with respect to the hot-wire resistor Rs, and a refrigerant temperature is Ta.

Therefore, by detecting the temperature difference (Th−Ta) as resistance value changes in the hot-wire resistor Rs and the resistor Rc of the thermometer in the Wheatstone bridge circuit and by controlling the supply current I so that the temperature difference (Th−Ta) becomes constant, $V \cdot I$ becomes proportional to $\alpha + \beta (G)^{1/2} (= h)$ in the foregoing relationship when the temperature difference (Th−Ta) is constant. Further, with respect to the application voltage V for the hot-wire resistor Rs, a relationship of $V = I \cdot Rh$ is established given that Rh is a resistance value of the hot-wire resistor Rs. Therefore, a correlation between the supply current I and $\{\alpha + \beta (G)^{1/2}\}^{1/2}$ is established. Inasmuch as the supply current I herein becomes a function of the weight G of the refrigerant, the refrigerant circulation amount can be derived as an electrical signal (flow detected signal) without necessity to carry out correction of a density, a pressure, a temperature, and so forth of the refrigerant. This flow detected signal is sent to the foregoing controller 70 as one of the various external information, and the controller 70 determines a refrigerant circulation amount target value based on the various external information and controls a drive signal to the control valve 43 of the variable displacement compressor based on a result of comparison between the flow detected signal and the refrigerant circulation amount target value so that the flow detected signal approaches the refrigerant circulation amount target value. In this event, when the flow detected signal is smaller than the refrigerant circulation amount target value, the current flowing into the coil is increased by the drive signal to narrow or close a passage between a discharge chamber and a crank chamber in the variable displacement compressor to reduce a crank chamber pressure Pc so as to increase an inclination of a swash plate, thereby increasing the refrigerant circulation amount.

Incidentally, in case of the main part of the electronic control system of the foregoing air conditioner, inasmuch as the engine speed sensor 77 is provided, it may be further configured to have non-illustrated refrigerant shortage detection means for detecting a shortage of the refrigerant in the refrigerant circulation circuit based on an engine speed signal from the engine speed sensor 77, the flow detected signal from the hot-wire flow sensor 72, and the refrigerant circulation amount target value obtained by the controller 70 so that the refrigerant shortage detection means detects the shortage of the refrigerant based on at least a difference value between the flow detected signal and the refrigerant circulation amount target value. This enables prediction of occurrence of leakage of the refrigerant and makes it possible to take a measure to prevent damage by burning of the variable displacement compressor that occurs in case of the shortage of the refrigerant, and thus is more preferable.

Figure 5:
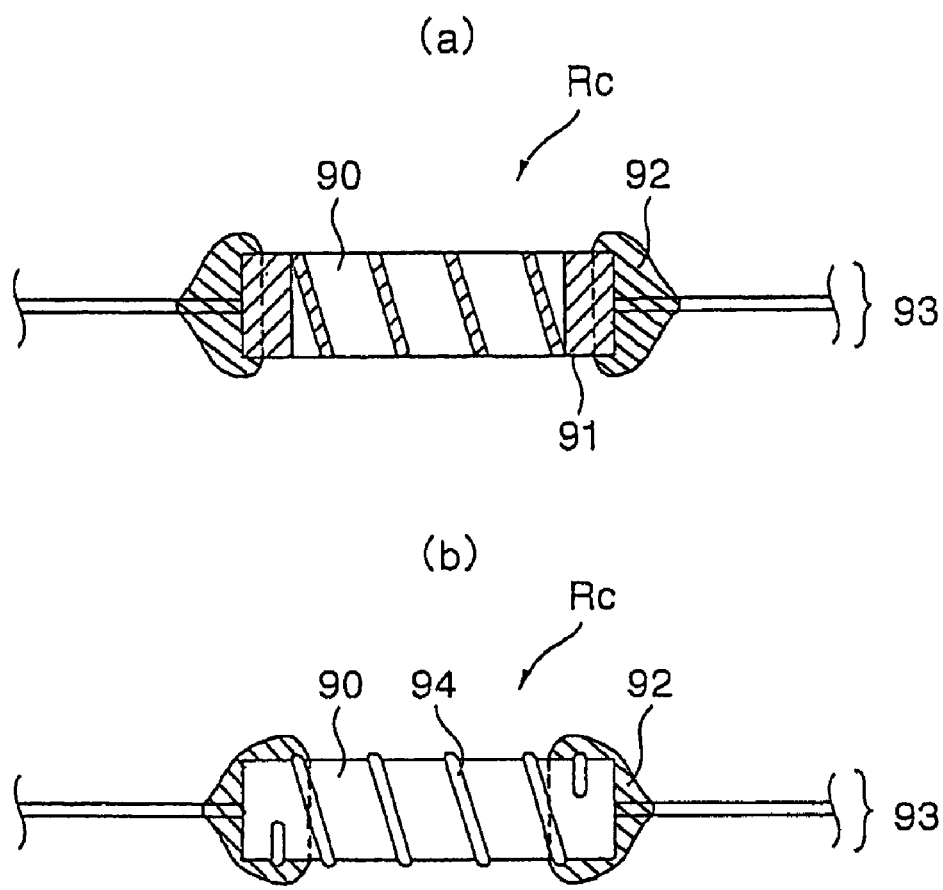
FIG. 5 illustrates a specific structure of a hot-wire resistor provided in the hot-wire flow sensor shown in FIG. 4, wherein (a) relates to a side view showing one embodiment thereof in a partly broken manner and (b) relates to a side view showing another embodiment thereof in a partly broken manner.

FIG. 5 illustrates a specific structure of the hot-wire resistor Rc provided in the foregoing hot-wire flow sensor 72, wherein FIG. 5(*a*) relates to a side view showing one embodiment thereof in a partly broken manner and FIG. 5(*b*) relates to a side view showing another embodiment thereof in a partly broken manner.

In case of the hot-wire resistor Rc shown in FIG. 5(*a*), it has a structure wherein a platinum thin film 91 is helically processed and disposed on the outer periphery of a highly insulating hollow cylindrical member 90 (or may be a solid cylindrical member), and the vicinities of connecting portions of conductor portions at both ends thereof where lead wires 93 are connected are fixed by a conductive adhesive 92.

In case of the hot-wire resistor Rc shown in FIG. 5(*b*), it has a structure wherein a platinum line 94 is helically coiled on the outer periphery of the same highly insulating hollow cylindrical member 90 (or may be a solid cylindrical member), and the vicinities of connecting portions of conductor portions at both ends thereof where lead wires 93 are connected are fixed by a conductive adhesive 92.

In case of applying the hot-wire resistor Rc of either structure, the resistance property of platinum, a material of the platinum thin film 91 or the platinum line 94, with respect to the temperature is relatively linear so that the structure of the control circuit 72*a* can be simplified.

Figure 6:
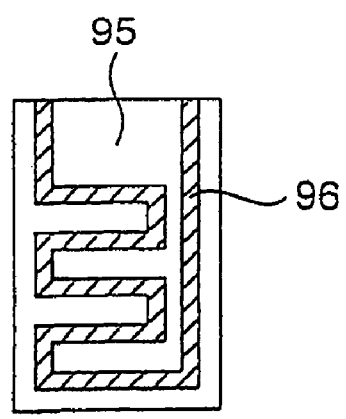
FIG. 6 is a plan view illustrating a simple structure of the hot-wire resistor and a thermometer provided in the hot-wire flow sensor shown in FIG. 4.

FIG. 6 is a plan view illustrating a simple structure of the hot-wire resistor Rc and the thermometer provided in the foregoing hot-wire flow sensor 72. Herein, the hot-wire resistor Rc and the thermometer are disposed by forming a predetermined pattern of a platinum thin film resistor 96 on both main surfaces of a highly insulating substrate (member) 95. In this case, since the hot-wire resistor Rc and the thermometer can be integrally provided on the insulating substrate 95, the sensor can be produced with a reduced size and easily attached.

On the other hand, if these hot-wire resistor Rc and thermometer are disposed on the discharge side in the variable displacement compressor, the temperature of the discharged refrigerant gas can be measured by the thermometer. Therefore, by controlling the discharge capacity so as not to exceed a temperature that extremely shortens the life duration of the variable displacement compressor (representing the function of the foregoing discharge capacity control means that controls the discharge capacity in the variable displacement compressor so as to reduce the refrigerant circulation amount when the temperature of the thermometer exceeds the set temperature according to the result of comparison between the temperature information of the thermometer and the set temperature), the life duration can be increased. As compared with a case of protecting the variable displacement compressor by an ON/OFF signal of a well-known temperature switch, the compressor can be protected if it is the type of maintaining the discharge capacity of the variable displacement compressor at minimum by the temperature switch. In this case, however, the compressor cannot carry out the compression work until the ambient temperature of the temperature switch reaches the set temperature or below so that the basic function of the air conditioner is extremely impeded during that time. In contrast, like in the invention of the present application, by controlling the discharge capacity so as to reduce the refrigerant circulation amount when the temperature of the thermometer exceeds the set temperature, the increased life duration of the variable displacement compressor can be achieved without impeding the basic function of the air conditioner.

Further, there are instances where the rise in temperature of the discharged refrigerant gas continues even by controlling the discharge capacity of the variable displacement compressor so as to reduce the refrigerant circulation amount. In those instances, it is expected that something abnormal has occurred inside the compressor. In such an event, the discharge capacity can be maintained at minimum in an instant (representing the function of the foregoing discharge capacity control means that controls the discharge capacity in the variable displacement compressor so as to minimize the refrigerant circulation amount when the temperature of the thermometer exceeds the set temperature according to the result of comparison between the temperature information of the thermometer and the set temperature) so that it is possible to suppress to the minimum spreading of foreign matter, caused by abrasion or the like of the inside parts of the compressor, into the refrigerant circulation circuit of the air conditioner. Generally, when the damage of the compressor is severe, it is necessary to clean the refrigerant circulation circuit of the air conditioner or exchange the respective components so that the economic burden becomes large. On the other hand, if there is provided the function of controlling the discharge capacity at minimum upon occurrence of the abnormal state, the air conditioner can be continuously used only by exchanging the variable displacement compressor.

In addition, if the temperature of the discharged refrigerant gas can be measured by the thermometer, inasmuch as correlation between the temperature and pressure of the discharged refrigerant gas is high, the pressure of the refrigerant gas can be estimated if the temperature of the refrigerant gas is known. Accordingly, by controlling the blow amount of the blower fan of the condenser provided in the refrigerant circulation circuit by the discharge capacity control means on the basis of the temperature information of the thermometer as described above, it is possible to control the condenser without using the pressure switch or the pressure sensor like in the conventional technique.

Figure 7:
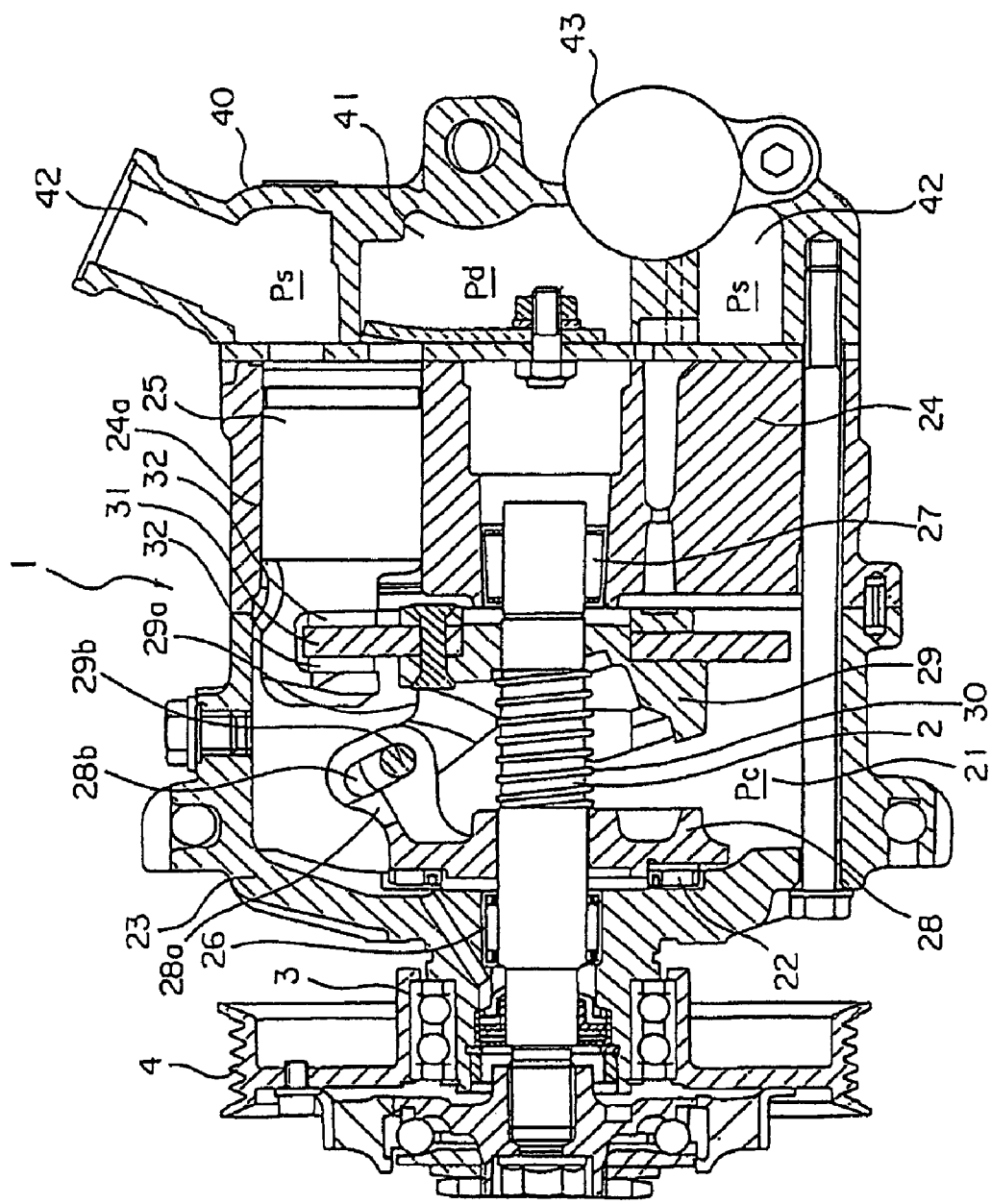
FIG. 7 is a side sectional view illustrating a basic structure of a variable displacement compressor provided in a refrigerant circulation circuit of the air conditioner explained in FIG. 3.

FIG. 7 is a side sectional view illustrating the basic structure of a variable displacement compressor 1 provided in the refrigerant circulation circuit of the air conditioner. This variable displacement compressor 1 is of the swash plate type wherein internal mechanisms are received in a cylinder block 24 and a front housing 23, an inner ring of a ball bearing 3 in a power transmission mechanism (power is transmitted from an engine being an external drive source) having a pulley 4 and attached to the front housing 23 is fixed, several cylinders 24a are provided in the cylinder block 24, and a piston 25 is inserted in each cylinder 24a and is capable of reciprocating motion therein. As other internal mechanisms, a rotation shaft 2 is supported on its both left and right sides by a radial bearing 26 disposed at the front housing 23 and a radial bearing 27 disposed at the cylinder block 24. The rotation shaft 2 has a rotor 28 fixed thereon and passes through a swash-plate support 29 that is tiltable in a predetermined angle range, and a pin 29b provided at an arm 29a of the swash-plate support 29 is movably inserted into a track-shaped hole 28b provided at an arm 28a of the rotor 28. A compression coil spring 30 is wound around the rotation shaft 2 between the rotor 28 and the swash-plate support 29. A swash plate 31 is fixed to the swash-plate support 29 and sliding shoes 32 are disposed between each piston 25 and both front and back surfaces of the swash plate 31. A thrust bearing 22 is disposed between the rotor 28 and the front housing 23 to receive a leftward thrust applied to the rotor 28.

On the other hand, the cylinder block 24 is attached with a rear housing 40 formed therein with a discharge chamber 41 located at the center thereof and a suction chamber 42 surrounding it. The rear housing has a valve formation body that is formed with a suction port and a suction valve for opening and closing it, and a discharge port and a discharge valve for opening and closing it, correspondingly to a bore of each cylinder 24a. Further, a control valve 43 for adjusting the pressure of a crank chamber 21 through a gas feed passage is disposed between the discharge chamber 41 in the rear housing 40 and the crank chamber 21.

In case of this variable displacement compressor 1, when the pulley 4 of the power transmission mechanism is rotated, the rotation shaft 2 is rotated to reciprocate each piston 25 leftward and rightward through the rotor 28, the swash-plate support 29, the swash plate 31, and each sliding shoe 32. The stroke of each piston 25 changes according to an inclination angle of the swash plate 31 so that the compression capacity of the gas is controlled. In this event, the refrigerant gas led into the suction chamber 42 from an outlet of the evaporator provided in the refrigerant circulation circuit of the air conditioner is initially maintained at a predetermined suction chamber pressure Ps and sucked into the bore of each cylinder 24a through the suction port and the suction valve by a forward motion of each piston 25 where it is compressed to a predetermined pressure by a backward motion of each piston 25, then it is discharged into the discharge chamber 41 through the discharge port and the discharge valve so as to change to a discharge chamber pressure Pd.

In any event, the air conditioner herein is increased in flow detection accuracy as compared with the air conditioner of the structure disclosed in FIG. 4 of Japanese Patent Application Publication (JP-A) No. 2001-140767, and further, inasmuch as the pressure control is properly performed through the gas feed passage by the control valve 43 that is controllably driven by the controller 70 through the drive circuit 80 while the refrigerant operation state is also monitored accurately, the crank chamber pressure Pc can be adjusted more finely.

In the foregoing main part of the electronic control system of the air conditioner, the description has been given about the case where the hot-wire flow sensor 72 is disposed in the refrigerant circulation circuit including the variable displacement compressor 1, preferably between the discharge chamber 41 and the inlet of the non-illustrated condenser. However, the pair of resistors R1 and R2 in the Wheatstone bridge circuit excluding the hot-wire resistor Rs and the resistor Rc of the thermometer, the control circuit 72a, and the potential difference detection circuit 72b in the detailed structure of the hot-wire flow sensor 72 described with reference to FIG. 4 may be incorporated in the control valve 43 of the variable displacement compressor 1.

As described above, in case of the air conditioner of the present invention, the main part of the electronic control system including the controller performing the air-conditioning control in the conventional air conditioner is improved so that the flow detected information from the hot-wire flow detection means, the refrigerant operation state information from the refrigerant state detection means, and the temperature information indicative of the temperature of the thermometer from the temperature information output means provided in the hot-wire flow detection means are newly added as various external information in the external information detection means, and therefore, the detection of the refrigerant circulation amount can be carried out more accurately and properly. Further, the pressure control can be properly carried out through the gas feed passage by the control valve 43 of the variable displacement compressor 1 provided in the refrigerant circulation circuit, the control valve being controllably driven through the drive circuit 80 by the controller 70 of the discharge capacity control means. Furthermore, the discharge capacity in the variable displacement compressor 1 is controlled so as not to exceed the temperature that shortens the life duration of the variable displacement compressor 1 without impeding the air-conditioning function, the discharge capacity is controlled to the minimum in the abnormal state, and further, the blow amount of the blower fan of the condenser provided in the refrigerant circulation circuit is also controlled. As a result, various advantages are exhibited like the crank chamber pressure Pc in the variable displacement compressor 1 can be adjusted more finely, the detection of the refrigerant circulation amount can be carried out more accurately and properly with the simpler structure as compared with the conventional air conditioner, the basic function (representing the engine load control and the air-conditioning control) including the accuracy and response characteristic of the control for achieving the stable maintenance of the room temperature is remarkably improved, further, the control of the discharge capacity is enabled for achieving the increased life duration of the variable displacement compressor 1 and the protection of the refrigerant circulation circuit in the abnormal state, and the condenser can be controlled without using the pressure switch or the pressure sensor as in the conventional technique.

I claim:

1. An air conditioner comprising a refrigerant circulation circuit including a variable displacement compressor, hot-wire flow detection means for detecting a refrigerant circulation amount in said variable displacement compressor to produce a flow detected signal obtained by converting it into an electrical signal, refrigerant state detection means for detecting from the external a refrigerant circulating operation state including a cooling load state at least in said refrigerant circulation circuit to produce a refrigerant operation state signal, and discharge capacity control means for determining a refrigerant circulation amount target value in said variable displacement compressor based on said flow detected signal and said refrigerant operation state signal and for performing a feedback control of a discharge capacity in said variable displacement compressor as a normal mode based on a result of comparison between said flow detected signal and said refrigerant circulation amount target value so that said flow detected signal approaches said refrigerant circulation amount target value.

2. The air conditioner according to claim 1, wherein said refrigerant state detection means includes a suction pressure sensor for detecting a low-pressure side pressure as said refrigerant circulating operation state at least in said refrigerant circulation circuit to produce a low-pressure detected signal, and said discharge capacity control means determines a low-pressure side pressure target value based on said low-pressure detected signal and performs a feedback control, switchably between itself and said feedback control of the normal mode, of the discharge capacity in said variable displacement compressor based on a result of comparison between said low-pressure detected signal and said low-pressure side pressure target value so that said low-pressure detection signal approaches said low-pressure side pressure target value.

3. The air conditioner according to claim 1, wherein said hot-wire flow detection means is disposed between a discharge chamber of said refrigerant circulation circuit including said variable displacement compressor and an inlet of a condenser.

4. The air conditioner according to claim 1, wherein said hot-wire flow detection means comprises a Wheatstone bridge circuit formed by connecting together a hot-wire resistor and a resistor of a thermometer which are exposed to a refrigerant flow and a pair of resistors which are not exposed to the refrigerant flow, a control circuit that applies a predetermined voltage to an input side, where said hot-wire resistor and said resistor of the thermometer in said Wheatstone bridge circuit are located, to control a current flowing in said hot-wire resistor so that a refrigerant temperature difference obtained from resistance value changes in said hot-wire resistor and said resistor of the thermometer becomes constant, and a potential difference detection circuit that detects an output potential difference between an output side grounded, where said pair of resistors in said Wheatstone bridge circuit are located, and a point between said hot-wire resistor and one of said pair of resistors to thereby obtain said flow detected signal.

5. The air conditioner according to claim 4, comprising temperature information output means for outputting temperature information indicative of a temperature of said thermometer and temperature comparison means for comparing a predetermined set temperature and said temperature information at said thermometer, wherein said discharge capacity control means controls the discharge capacity of said variable displacement compressor so as to reduce the refrigerant circulation amount when the temperature of said thermometer exceeds said set temperature according to a result of comparison by said temperature comparison means.

6. The air conditioner according to claim 4, comprising temperature information output means for outputting temperature information indicative of a temperature of said thermometer and temperature comparison means for comparing a predetermined set temperature and said temperature information at said thermometer, wherein said discharge capacity control means controls the discharge capacity of said variable displacement compressor so as to minimize the refrigerant circulation amount when the temperature of said thermometer exceeds said set temperature according to a result of comparison by said temperature comparison means.

7. The air conditioner according to claim 4, comprising temperature information output means for outputting temperature information indicative of a temperature of said thermometer, wherein said discharge capacity control means controls a blow amount of a blower fan of a condenser provided in said refrigerant circulation circuit on the basis of said temperature information at said thermometer.

8. The air conditioner according to claim 4, wherein said hot-wire resistor is formed by helically processing and disposing a platinum thin film on an outer periphery of a hollow cylindrical member or a solid cylindrical member which are high insulation or by helically coiling a platinum line on the outer periphery of said hollow cylindrical member or said solid cylindrical member.

9. The air conditioner according to claim 4, wherein said hot-wire resistor and said thermometer are formed and disposed as a predetermined pattern of a platinum thin film resistor on a highly insulating substrate member.

10. The air conditioner according to claim 4, wherein said pair of resistors in said Wheatstone bridge circuit excluding said hot-wire resistor and said resistor of the thermometer, said control circuit, and said potential difference detection circuit of said hot-wire flow detection means are incorporated in a control valve of said variable displacement compressor.

11. The air conditioner according to claim 1, comprising engine speed detection means mounted in a vehicle having an engine mounted therein for detecting a speed of said engine to produce an engine speed signal and further comprising refrigerant shortage detection means for detecting a shortage of refrigerant in said refrigerant circulation circuit based on said engine speed signal, said flow detection signal, and said refrigerant circulation amount target value.

12. The air conditioner according to claim 11, wherein said refrigerant shortage detection means detects the shortage of refrigerant based on at least a difference value between said flow detected signal and said refrigerant circulation amount target value.

13. An air conditioner comprising:
a refrigerant circulation circuit comprising a variable displacement compressor,
hot-wire flow detection means for detecting a refrigerant circulation amount in said variable displacement compressor to produce a flow detected signal obtained by converting it into an electrical signal, disposed between a discharge chamber of said refrigerant circulation circuit including said variable displacement compressor and an inlet of a condenser,
refrigerant state detection means for detecting from the external a refrigerant circulating operation state including a cooling load state at least in said refrigerant circulation circuit to produce a refrigerant operation state signal, comprising a suction pressure sensor for detecting a low-pressure side pressure as said refrigerant circulating operation state at least in said refrigerant circulation circuit to produce a low-pressure detected signal, and
discharge capacity control means for determining a refrigerant circulation amount target value in said variable displacement compressor based on said flow detected signal and said refrigerant operation state signal and for performing a feedback control of a discharge capacity in said variable displacement compressor as a normal mode based on a result of comparison between said flow detected signal and said refrigerant circulation amount target value so that said flow detected signal approaches said refrigerant circulation amount target value, wherein said discharge capacity control means determines a low-pressure side pressure target value based on said low-pressure detected signal and performs a feedback control, switchably between itself and said feedback control of the normal mode, of the discharge capacity in said variable displacement compressor based on a result of comparison between said low-pressure detected signal and said low-pressure side pressure target value so that said low-pressure detection signal approaches said low-pressure side pressure target value.

14. The air conditioner according to claim 13, wherein said hot-wire flow detection means comprises a Wheatstone bridge circuit formed by connecting together a hot-wire resistor and a resistor of a thermometer which are exposed to a refrigerant flow and a pair of resistors which are not exposed to the refrigerant flow, a control circuit that applies a predetermined voltage to an input side, where said hot-wire resistor and said resistor of the thermometer in said Wheatstone bridge circuit are located, to control a current flowing in said hot-wire resistor so that a refrigerant temperature difference obtained from resistance value changes in said hot-wire resistor and said resistor of the thermometer becomes constant, and a potential difference detection circuit that detects an output potential difference between an output side grounded, where said pair of resistors in said Wheatstone bridge circuit are located, and a point between said hot-wire resistor and one of said pair of resistors to thereby obtain said flow detected signal.

15. The air conditioner according to claim 14, comprising temperature information output means for outputting temperature information indicative of a temperature of said thermometer and temperature comparison means for comparing a predetermined set temperature and said temperature information at said thermometer, wherein said discharge capacity control means controls the discharge capacity of said variable displacement compressor so as to reduce the refrigerant circulation amount when the temperature of said thermometer exceeds said set temperature according to a result of comparison by said temperature comparison means.

16. The air conditioner according to claim 14, comprising temperature information output means for outputting temperature information indicative of a temperature of said thermometer and temperature comparison means for comparing a predetermined set temperature and said temperature information at said thermometer, wherein said discharge capacity control means controls the discharge capacity of said variable displacement compressor so as to minimize the refrigerant circulation amount when the temperature of said thermometer exceeds said set temperature according to a result of comparison by said temperature comparison means.

17. The air conditioner according to claim 14, comprising temperature information output means for outputting temperature information indicative of a temperature of said thermometer, wherein said discharge capacity control means controls a blow amount of a blower fan of a condenser provided in said refrigerant circulation circuit on the basis of said temperature information at said thermometer.

18. The air conditioner according to claim 14, wherein said hot-wire resistor is formed by helically processing and disposing a platinum thin film on an outer periphery of a hollow cylindrical member or a solid cylindrical member which are high insulation or by helically coiling a platinum line on the outer periphery of said hollow cylindrical member or said solid cylindrical member.

19. The air conditioner according to claim 14, wherein said hot-wire resistor and said thermometer are formed and disposed as a predetermined pattern of a platinum thin film resistor on a highly insulating substrate member.

20. The air conditioner according to claim 14, wherein said pair of resistors in said Wheatstone bridge circuit excluding said hot-wire resistor and said resistor of the thermometer, said control circuit, and said potential difference detection circuit of said hot-wire flow detection means are incorporated in a control valve of said variable displacement compressor.

21. The air conditioner according to claim 13, comprising engine speed detection means mounted in a vehicle having an engine mounted therein for detecting a speed of said engine to produce an engine speed signal and further comprising refrigerant shortage detection means for detecting a shortage of refrigerant in said refrigerant circulation circuit based on said engine speed signal, said flow detection signal, and said refrigerant circulation amount target value.

22. The air conditioner according to claim 21, wherein said refrigerant shortage detection means detects the shortage of refrigerant based on at least a difference value between said flow detected signal and said refrigerant circulation amount target value.

* * * * *